US009322309B2

(12) United States Patent
Beyer et al.

(10) Patent No.: US 9,322,309 B2
(45) Date of Patent: Apr. 26, 2016

(54) COMPACT EXHAUST GAS TREATMENT UNIT WITH MIXING REGION, METHOD FOR MIXING AN EXHAUST GAS AND VEHICLE

(71) Applicant: EMITEC GESELLSCHAFT FUER EMISSIONSTECHNOLOGIE MBH, Lohmar (DE)

(72) Inventors: Sebastian Beyer, Meckenbeuren (DE); Bernd Danckert, Meckenbeuren (DE); Martin Walter Ender, Turin (IT); Samuel Vogel, Bad Waldsee (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 14/040,951

(22) Filed: Sep. 30, 2013

(65) Prior Publication Data

US 2014/0026540 A1  Jan. 30, 2014

Related U.S. Application Data

(63) Continuation of application No. PCT/EP2012/055800, filed on Mar. 30, 2012.

(30) Foreign Application Priority Data

Mar. 30, 2011  (DE) .......................... 10 2011 015 512

(51) Int. Cl.
*F01N 3/00* (2006.01)
*F01N 3/20* (2006.01)
(Continued)

(52) U.S. Cl.
CPC .. *F01N 3/00* (2013.01); *F01N 3/20* (2013.01); *F01N 13/0097* (2014.06);
(Continued)

(58) Field of Classification Search
CPC ..... F02D 9/04; F02D 41/029; F01N 2240/20; F01N 1/166; F01N 13/02; F01N 13/10; F01N 9/002; F01N 3/0842; F01N 3/035
USPC .................................... 60/274, 295, 297, 301
See application file for complete search history.

(56) References Cited

U.S. PATENT DOCUMENTS 5,285,640 A 2/1994 Olivo
5,431,893 A 7/1995 Hug et al.
(Continued)

FOREIGN PATENT DOCUMENTS

DE  2123532 A1  11/1972
DE  4203807 A1  8/1993
(Continued)

OTHER PUBLICATIONS

International Search Report of PCT/EP2012/055800, Dated Jul. 23, 2012.

*Primary Examiner* — Patrick Maines
(74) *Attorney, Agent, or Firm* — Laurence A. Greenberg; Werner H. Stemer; Ralph E. Locher

(57) ABSTRACT

An exhaust-gas treatment unit includes a housing with a first end and an oppositely disposed second end, a tube extending from the first end to the second end and serving as an inflow region for an exhaust gas, a deflecting region in the vicinity of the second end for the exhaust gas, and a return flow region extending between the tube and the housing. In the deflecting region, the exhaust gas is mixed and transferred into the return flow region. A method for mixing an exhaust gas in an exhaust-gas treatment unit and a vehicle having the exhaust-gas treatment unit and carrying out the method, are also provided.

12 Claims, 2 Drawing Sheets

(51) Int. Cl.
   *F01N 13/00* (2010.01)
   *F01N 1/08* (2006.01)
(52) U.S. Cl.
   CPC ............ *F01N 1/084* (2013.01); *F01N 2240/20* (2013.01); *F01N 2470/02* (2013.01); *F01N 2470/04* (2013.01); *F01N 2470/22* (2013.01); *F01N 2490/06* (2013.01)

(56) References Cited

U.S. PATENT DOCUMENTS

| | | | |
|---|---|---|---|
| 8,938,945 B2 * | 1/2015 | Hylands et al. | 60/273 |
| 2002/0106312 A1 * | 8/2002 | Harris | 422/168 |
| 2002/0112915 A1 * | 8/2002 | Price | 181/264 |
| 2002/0187093 A1 * | 12/2002 | Muller et al. | 423/235 |
| 2006/0107656 A1 | 5/2006 | Bruck | |
| 2006/0266024 A1 * | 11/2006 | Ishimoto et al. | 60/299 |
| 2008/0041036 A1 * | 2/2008 | Witte-Merl | 60/282 |
| 2008/0141662 A1 * | 6/2008 | Schuster et al. | 60/310 |
| 2009/0065294 A1 * | 3/2009 | O'Malley et al. | 181/229 |
| 2009/0158618 A1 * | 6/2009 | Tuck | 34/639 |
| 2010/0199645 A1 * | 8/2010 | Telford | 60/295 |
| 2010/0212301 A1 * | 8/2010 | De Rudder et al. | 60/299 |
| 2013/0152557 A1 * | 6/2013 | Brugger | 60/295 |
| 2014/0311133 A1 * | 10/2014 | Norling et al. | 60/286 |

FOREIGN PATENT DOCUMENTS

| | | | |
|---|---|---|---|
| DE | 103112236 A1 | | 9/2004 |
| DE | 102009036511 A1 | | 2/2011 |
| DE | 102010021438 A1 | * | 12/2011 |
| JP | 2007506893 A | | 3/2007 |
| KR | 100449784 B1 | | 2/2005 |
| WO | 9012950 A1 | | 11/1990 |
| WO | 9701387 A1 | | 1/1997 |
| WO | 2007110575 A1 | | 10/2007 |
| WO | 2011/147556 A1 | | 12/2011 |

* cited by examiner

COMPACT EXHAUST GAS TREATMENT UNIT WITH MIXING REGION, METHOD FOR MIXING AN EXHAUST GAS AND VEHICLE

CROSS-REFERENCE TO RELATED APPLICATION

This is a continuation, under 35 U.S.C. §120, of copending International Application No. PCT/EP2012/055800, filed Mar. 30, 2012, which designated the United States; this application also claims the priority, under 35 U.S.C. §119, of German Patent Application DE 10 2011 015 512.0, filed Mar. 30, 2011; the prior applications are herewith incorporated by reference in their entirety.

BACKGROUND OF THE INVENTION

Field of the Invention

The invention relates to a compact exhaust gas treatment unit in which mixing of an exhaust gas takes place. The invention also relates to a method for mixing the exhaust gas and to a vehicle having the exhaust gas treatment unit and carrying out the method. In particular, the mixing of the exhaust gas takes place together with treatment of the exhaust gas with an additive or a reagent.

Due to the continuous increase in traffic and/or increasingly strict standards for exhaust gas, it is important in the case of vehicles having an internal combustion engine that the exhaust gases from the internal combustion engine should be cleaned efficiently. For that purpose, the prior art provides exhaust gas purification systems in which the exhaust gas from the internal combustion engine is passed across a catalytically active surface and pollutants in the exhaust gas, such as nitrogen oxide compounds, soot particles, carbon monoxide, hydrocarbons, etc., are converted into substances such as nitrogen, water and carbon dioxide with the aid of a catalyst material deposited on that surface. As a rule, relatively high exhaust gas temperatures are required for efficient conversion of exhaust gases. As a rule, the temperatures of the exhaust gases from an internal combustion engine are highest directly after the exhaust gases have left the internal combustion engine, and therefore a location close to the internal combustion engine (e.g. in the engine compartment of a vehicle) is a favorable location for the placement of an exhaust gas purification system. However, as a rule, the installation space in the vicinity of the engine is limited in vehicles of all kinds.

In order to nevertheless be able to use the limited installation space in the engine compartment for exhaust gas purification systems, particularly compact exhaust gas treatment units with concentric throughflow have been developed. Those units are known, for example, from German Patent Application DE 103 01 138 A1, corresponding to U.S. Patent Application Publication No. 2006/0008397. In an exhaust gas purification system of that kind, the exhaust gas first of all flows through a concentrically disposed inflow region, and is then deflected and flows through an outer return flow region. In that case, the return flow region surrounds the inflow region on the outside thereof, ensuring efficient heat exchange between the inflow region and the return flow region. At the same time, catalytically active surfaces can additionally be disposed in the inflow region and the return flow region, and therefore the exhaust gases are as a rule additionally heated by corresponding catalytic reactions. In that way, the exhaust gas temperature in the exhaust system can be increased or kept high through the efficient heat exchange between the inflow region and the return flow region, ensuring particularly efficient conversion of the pollutants. At the same time, a particularly compact configuration of the exhaust gas purification system is achieved through the division of the exhaust system into an inflow region, a deflecting region and a return flow region, and therefore the system can be disposed in the engine compartment or in the vicinity of the internal combustion engine.

In exhaust gas purification systems of that kind, there may also be provision for the addition of a reagent to the exhaust gas. That reagent includes at least one of the following, for example: hydrocarbon, reducing agent or reducing agent precursor (in particular liquid aqueous urea solution). The reagent contributes to conversion of pollutants in the exhaust gas into harmless components, in particular in interaction with coatings specially provided for that purpose. In that case, such additional units for those reagents are disposed in such a way that as far as possible optimum distribution in the exhaust gas or a high degree of evaporation of the reagent supplied is achieved. In that case, the reagent is applied directly to a honeycomb body, for example, in the direction of flow or counter to the direction of flow of the exhaust gas, with the result that evaporation is promoted by the impingement of the reagent on the (hot) honeycomb body and fine distribution of the reagent droplets and, if required, storage of the reagent in the structure or the coating of the honeycomb body is achieved. However, that application of the reagent to a honeycomb body can also lead to the coating of the honeycomb body being damaged, e.g. by water shock or by the temperature difference between the honeycomb body and the reagent.

Optimum distribution of the reagent in the exhaust gas is desired because, in that way, particularly efficient conversion of pollutants over the entire flow cross section can be achieved. In particular, such mixing is therefore recommended before flow through an exhaust gas treatment device (e.g. a catalytic converter or similar), thus allowing all regions of the exhaust gas treatment device to be supplied uniformly with the reagent. As soon as the exhaust gas has entered the exhaust gas treatment device, which as a rule has ducts, there is then only inadequate distribution of the exhaust gas over the entire throughflow cross section of the exhaust gas treatment device. For that reason, the degree of mixing of the reagent and the exhaust gas should be great enough to ensure that, even before entry to an exhaust gas treatment device, a uniform supply of the reagent to the catalytically active surfaces of the exhaust gas treatment device is possible.

That mixing of the exhaust gas is advantageous, in particular, even without the addition of a reagent. The pollutants in the exhaust gas are likewise not uniformly distributed over the cross section of the exhaust line. In that case too, additional mixing (only) of the exhaust gas has the effect that the pollutants and other constituents of the exhaust gas, e.g. nitrogen dioxide or unburned hydrocarbons, are uniformly distributed. In that way, even an exhaust gas treatment device disposed downstream is supplied with the exhaust gas in such a way that the exhaust gas has as uniform as possible a composition over the entire cross section of the exhaust gas treatment device.

SUMMARY OF THE INVENTION

It is accordingly an object of the invention to provide a compact exhaust gas treatment unit with a mixing region, a method for mixing an exhaust gas and a vehicle, which overcome the hereinafore-mentioned disadvantages and at least partially solve the highlighted technical problems of the heretofore-known units, methods and vehicles of this general type. In particular, the intention is to specify an exhaust gas treatment unit which, on one hand, ensures a compact construction and, on the other hand, allows a particularly high degree of mixing of the exhaust gas (in particular with a reagent).

With the foregoing and other objects in view there is provided, in accordance with the invention, an exhaust gas treatment unit, comprising a housing with a first end and a second end disposed opposite each other, and a tube extending from the first end to the second end as an inflow region for an exhaust gas. The exhaust gas treatment unit furthermore has a deflecting region in the region or vicinity of the second end for the exhaust gas, and a return flow region extending between the tube and the housing. Adjacent the second end, the tube has an outlet region, from which a first partial exhaust gas flow flows into the deflecting region, and the tube has at least one lateral opening in the deflecting region upstream of the outlet region, so that the first partial exhaust gas flow collides in the deflecting region with at least one second partial exhaust gas flow flowing out of the at least one opening.

Starting from the internal combustion engine, the exhaust gas flows through an exhaust line toward the exhaust gas treatment unit and enters the inflow region thereof through the first end. In the rear, downstream region of the inflow region or of the tube the exhaust gas is divided into at least one first partial exhaust gas flow and one second partial exhaust gas flow. The second partial exhaust gas flow enters the deflecting region through at least one lateral opening in the tube. The first partial exhaust gas flow flows past the at least one lateral opening and leaves the tube in an outlet region disposed adjacent the second end. From the outlet region, the first partial exhaust gas flow enters the deflecting region and is deflected there in such a way that it flows substantially in the direction of the return flow region, that is to say, in particular, opposite to the direction of flow of the exhaust gas in the inflow region. On the way to the return flow region, in the deflecting region, the first partial exhaust gas flow which has emerged from the outlet region then impinges on the at least one second partial exhaust gas flow, which is emerging from the at least one lateral opening in the tube. This collision of the partial exhaust gas flows, which are not unidirectional, then promotes the mixing of the exhaust gas in a particularly advantageous manner. This is attributable, in particular, to the fact that the second partial exhaust gas flow emerging from the at least one lateral opening has a direction of flow which is oriented substantially outward in a radial direction in the direction of the housing and, in particular, at least partially in the direction of the second end. The second partial exhaust gas flow which has emerged from the outlet region into the deflecting region has, in particular, a direction of flow which is oriented substantially in a direction toward the return flow region. As a result, the first and second partial exhaust gas flows produced in this case have directions of flow in the deflecting region, which are at least partially opposed to one another, and therefore improved mixing of the exhaust gas is achieved. Adjoining the deflecting region, radially to the outside of the concentrically disposed tube, is the return flow region, which is disposed between the tube and the housing and surrounds the inflow region. The reunited exhaust gas from the first partial exhaust gas flow and the second partial exhaust gas flow flows through this return flow region, in particular in the opposite direction to the exhaust gas in the inflow region. After flowing through the return flow region, the exhaust gas emerges from the exhaust gas treatment unit, and, in particular, there is another deflection of the exhaust gas in this case into a common exhaust line.

According to a particularly advantageous embodiment of the exhaust gas treatment unit, the reagent feed is, in particular, disposed outside the exhaust gas treatment unit, more specifically in a region of the exhaust line which is disposed upstream of the inflow region. Accordingly, the reagent is passed through the inflow region with the exhaust gas, wherein the significant mixing of the reagent with the exhaust gas then takes place in the deflecting region through the collision of the at least one first partial exhaust gas flow and the at least one second partial exhaust gas flow.

In particular, a first exhaust gas treatment device, e.g. a hydrolysis catalytic converter, is disposed in the inflow region itself, bringing about conversion of the added reagent, e.g. a reducing agent precursor. After the exhaust gas has flowed through this exhaust gas treatment device, there is, in particular, a reducing agent (e.g. ammonia) available, and only then is this reducing agent distributed uniformly in the exhaust gas in the deflecting region. Through the use of this uniform distribution of the reducing agent in the deflecting region, an exhaust gas treatment device (e.g. an SCR catalytic converter), in particular one disposed in the return flow region, can be supplied uniformly with the reagent, thus ensuring conversion of the pollutants in all regions of the exhaust gas treatment device.

According to another advantageous embodiment, however, it is also possible for a reagent to be fed-in in the inflow region of the exhaust gas treatment unit itself and/or in the deflecting region and/or in the outlet region of the exhaust gas treatment unit. For this purpose, a feed unit for the reagent can be disposed, in particular, in the region of the second end.

In particular, particularly efficient mixing of the exhaust gas can take place by using an exhaust gas treatment unit of this kind while simultaneously ensuring that the exhaust gas treatment unit has a small overall volume. The cross-sectional areas for throughflow in the inflow region and in the return flow region preferably correspond substantially to one another. The dividing surface disposed between the inflow region and the return flow region is, in particular, formed by a tube which has a wall thickness of 0.2 to 3 mm. In particular, the mixing of the exhaust gas takes place in the deflecting region of the exhaust gas treatment unit, thus ensuring that the exhaust gas is already sufficiently mixed before entry to the return flow region. Thus, the mixed exhaust gas (in particular mixed with a reagent) can then enter the return flow region, in which, in particular, further exhaust gas treatment devices are disposed. The overall size of the exhaust gas treatment unit is therefore defined, in particular, only by the throughflow cross sections of the inflow region and of the return flow region since the wall thickness of the tube or of the wall surrounding the inflow region and the thickness of the housing are negligible. A configuration of an exhaust gas treatment device through which there can be at least partially radial flow, which would greatly increase the overall size of the exhaust gas treatment unit, is not required and not provided in this case. The inside diameter of the inflow region or the inside diameter of the tube is, in particular, 75 mm to 200 mm, wherein the inside diameter of the return flow region, i.e. of the housing, is, in particular, 300 mm to 600 mm. It is thereby possible, in particular, to treat or convert exhaust gas mass flows of 1,500 to 6,000 kg/h. The depth of the deflecting region, i.e. the distance from the second end to the beginning of the return flow region, is, in particular, 0.5 times to 1 times the inside diameter of the return flow region or the inside diameter of the housing.

In accordance with another advantageous feature of the exhaust gas treatment unit of the invention, the at least one opening has at least one baffle element, which deflects the at least one second partial exhaust gas flow out of the inflow region or tube and into the deflecting region.

In accordance with a further advantageous feature of the exhaust gas treatment unit of the invention, the at least one baffle element extends into the inflow region or tube.

In accordance with an added advantageous feature of the exhaust gas treatment unit of the invention, the at least one baffle element is formed by using a wall of the inflow region or tube.

According to a preferred embodiment, the baffle element itself is part of the inflow region or tube and is, for example, formed by being punched out and bent over from the tube wall itself. In particular, the baffle element is connected only to the downstream boundary of the opening. In particular, this means that the baffle element is formed by partial separation from the wall of the inflow region and subsequent bending over, with the opening thus being provided upstream of the baffle element. The exhaust gas thus impinges on the baffle element and is deflected into the deflecting region by the baffle element.

In particular, a plurality of openings is disposed at a single depth, as seen from the second end of the housing. If required, a plurality of openings is disposed at several different depths, as seen from the second end of the housing, with the result that second partial exhaust gas flows flow into the deflecting region downstream of one another. The openings are preferably disposed in a rotationally symmetrical manner around the tube axis. In particular, the openings have an opening cross-sectional area through which the second partial exhaust gas flow flows.

In accordance with an additional advantageous feature of the exhaust gas treatment unit of the invention, the at least one opening has an opening cross-sectional area of at least 150% of a tube (inflow region) cross-sectional area. The total opening cross-sectional area of all the openings is, in particular, at least 200% of the tube cross-sectional area, preferably less than 220% of the tube cross-sectional area.

In accordance with yet another preferred feature of the exhaust gas treatment unit of the invention, the tube makes contact with the second end, and at least one lateral outlet forms the outlet region. The first partial exhaust gas flow passes through the lateral outlet and thus flows in from the inflow region into the deflecting region. In particular, the at least one lateral outlet is likewise formed by punched holes in the tube. In this embodiment of the exhaust gas treatment unit, the tube can be attached to the second end, thereby making it possible to ensure a particularly stiff configuration of the exhaust gas treatment unit. In particular, the at least one outlet directly adjoins the second end. The at least one outlet preferably has no baffle element. The exhaust gas of the first partial exhaust gas flow is deflected in such a way, in particular by a special configuration of the second end, that the exhaust gas then flows substantially in the direction of the return flow region.

According to a preferred embodiment, the second end has a closed construction, and therefore, in particular, no further partial exhaust gas flow flows into the exhaust gas treatment unit through the second end.

According to a particular embodiment of the exhaust gas treatment unit, a metering unit for a reagent can be provided in or at the second end, with the metering unit feeding a reagent directly into the deflecting region or into the inflow region.

Thus, the mixing of the exhaust gas takes place, in particular, exclusively through the collision of (at least one) first partial exhaust gas flow and (at least one) second partial exhaust gas flow in the deflecting region.

With the objects of the invention in view, there is also provided a method for mixing an exhaust gas in an exhaust gas treatment unit, the method comprising at least the following steps:
a) central supply of an exhaust gas through an inflow region,
b) division of the exhaust gas into at least one first partial exhaust gas flow and at least one second partial exhaust gas flow,
c) deflection of the partial exhaust gas flows, wherein the at least one first partial exhaust gas flow flows out of an outlet region of the inflow region and into a deflecting region and is deflected again there, and wherein the at least one second partial exhaust gas flow flows into the deflecting region from at least one opening disposed upstream of the outlet region,
d) collision and mixing of the at least one first partial exhaust gas flow with the at least one second partial exhaust gas flow in the deflecting region, and
e) joint onward transfer of the first partial exhaust gas flow and of the second partial exhaust gas flow through a return flow region.

In particular, reference is made to the explanations with respect to the exhaust gas treatment unit according to the invention, which can also expressly be applied to the method as well.

In accordance with another particularly advantageous mode of the method of the invention, at least 30% and at most 60% of the exhaust gas forms the second partial exhaust gas flow.

With the objects of the invention in view, there is concomitantly provided a vehicle, comprising an internal combustion engine, an exhaust line and an exhaust gas treatment unit according to the invention, or an exhaust gas treatment unit capable of being operated by a method according to the invention.

The exhaust gas treatment unit can, in particular, also be employed for motor vehicles, railroads, watercraft or aircraft since, in this case too, there are demanding requirements with regard to compact construction and conversion of pollutants.

Other features which are considered as characteristic for the invention are set forth in the appended claims, noting that the features presented individually in the claims can be combined in any technologically meaningful way and indicate further embodiments of the invention. The description, especially in conjunction with the figures, explains the invention further and gives supplementary illustrative embodiments of the invention.

Although the invention is illustrated and described herein as embodied in a compact exhaust gas treatment unit with a mixing region, a method for mixing an exhaust gas and a vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL
VIEWS OF THE DRAWING

DETAILED DESCRIPTION OF THE INVENTION

Figure 1:
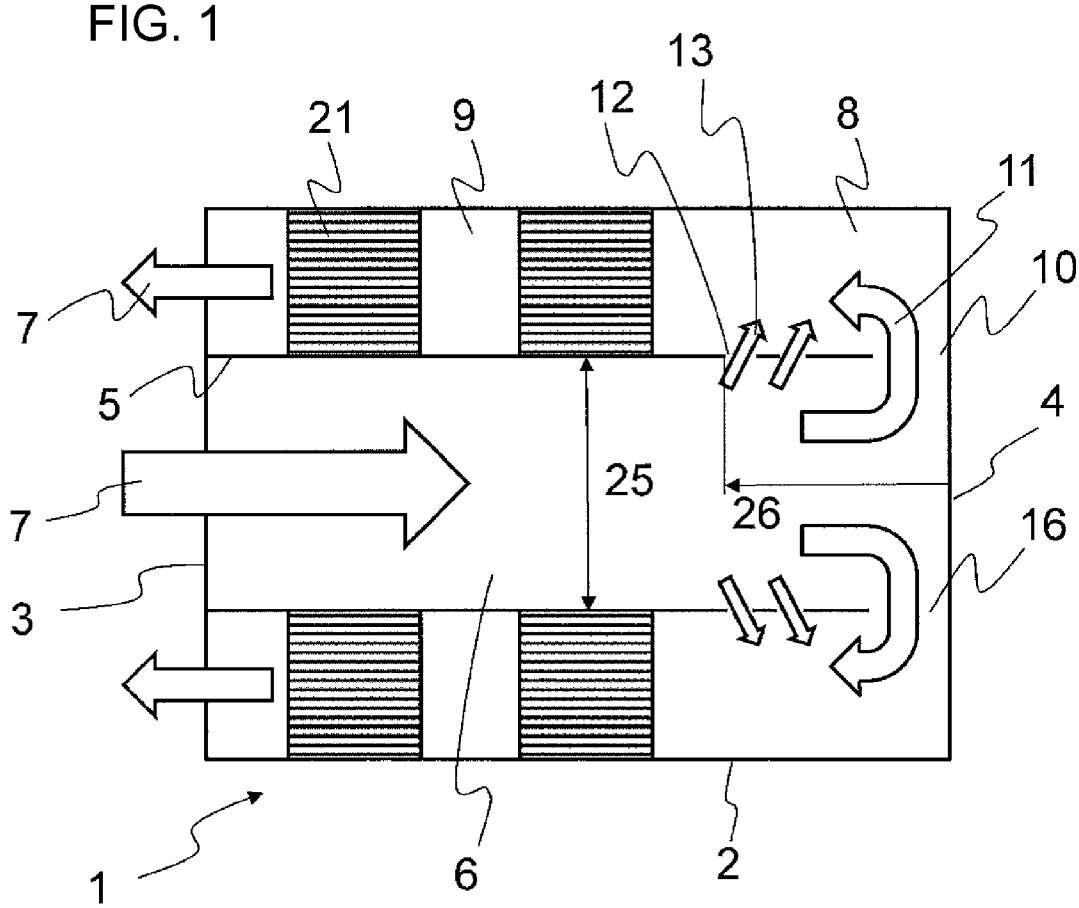
FIG. 1 is a diagrammatic, longitudinal-sectional view of a first embodiment of an exhaust gas treatment unit.

Referring now in detail to the figures of the drawings, which show particularly preferred illustrative embodiments to which the invention is not restricted and first, particularly, to FIG. 1 thereof, there is seen an exhaust gas treatment unit 1 in accordance with a first embodiment. The exhaust gas treatment unit 1 is formed by a housing 2 and by a tube 5, which is disposed concentrically in the housing 2 and forms an inflow region 6 for an exhaust gas 7. The exhaust gas 7 enters the housing 2 through a first end or end face 3. The tube 5 is correspondingly open to the first end 3 of the housing 2, with the result that the exhaust gas 7 which has entered there through the tube 5 in the direction of a second end or end face 4. The tube 5 or the inflow region 6 has an inside tube diameter 25. The second end 4 has a closed construction, with the result that the exhaust gas 7 is deflected there. In a downstream part of the tube 5, the exhaust gas 7 is divided into a first partial exhaust gas flow 11 and a plurality of second partial exhaust gas flows 13. The first partial exhaust gas flow 11 leaves the tube 5 through an outlet region 10, which is disposed adjacent the second end 4 of the housing 2. The first partial exhaust gas flow 11 thus flows through the outlet region 10 into a deflecting region 8, by which the exhaust gas 7 is deflected into a direction of flow which is substantially opposed to the direction of flow in the inflow region 6. Instead of then entering a return flow region 9 directly, the exhaust gas flow in the inflow region 6, according to the invention, is divided in the exhaust gas treatment unit 1. The second partial exhaust gas flows 13 enter the deflecting region 8 (in the inflow region 6) through openings 12 upstream of the outlet region 10. In the deflecting region 8, the first partial exhaust gas flow 11 collides with the second partial exhaust gas flows 13, which are flowing-in substantially transversely thereto. Due to the collision between these partial exhaust gas flows 11, 13, there is extensive mixing of the exhaust gas 7. In this case, the openings 12 are disposed at several depths 26, starting from the second end 4. It is only after this collision of the partial exhaust gas flows 11, 13 that the now combined (and mixed) exhaust gas 7 enters the return flow region 9. Disposed in the return flow region 9 are exhaust gas treatment devices 21, which can include a hydrolysis catalytic converter and an SCR catalytic converter in series, for example. In addition or as an alternative, storage elements, heating catalytic converters, particulate filters and particle agglomerators can be employed in a known configuration. The exhaust gas 7 flows out of the return flow region 9 and leaves the housing 2 of the exhaust gas treatment unit 1.

Figure 2:
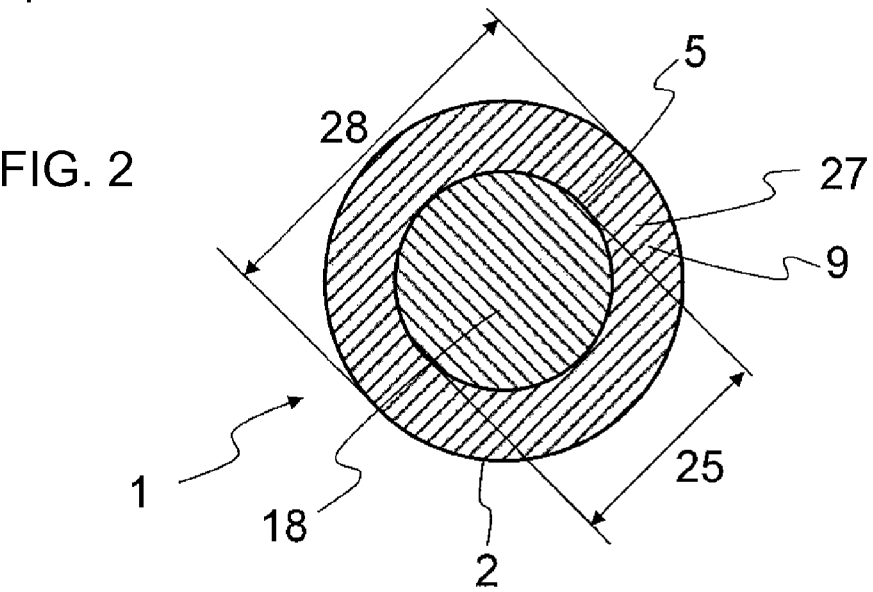
FIG. 2 is a cross-sectional view of the exhaust gas treatment unit according to FIG. 1.

FIG. 2 shows a diagrammatic cross section of the exhaust gas treatment unit 1 shown in FIG. 1. The exhaust gas treatment unit 1 has a housing 2 with an inside housing diameter 28 and a concentrically disposed tube 5 with an inside tube diameter 25. The tube 5 has a cross-sectional tube area 18 through which the exhaust gas can flow. The return flow region 9 has a cross-sectional return flow region area 27 through which the exhaust gas can flow.

Figure 3:
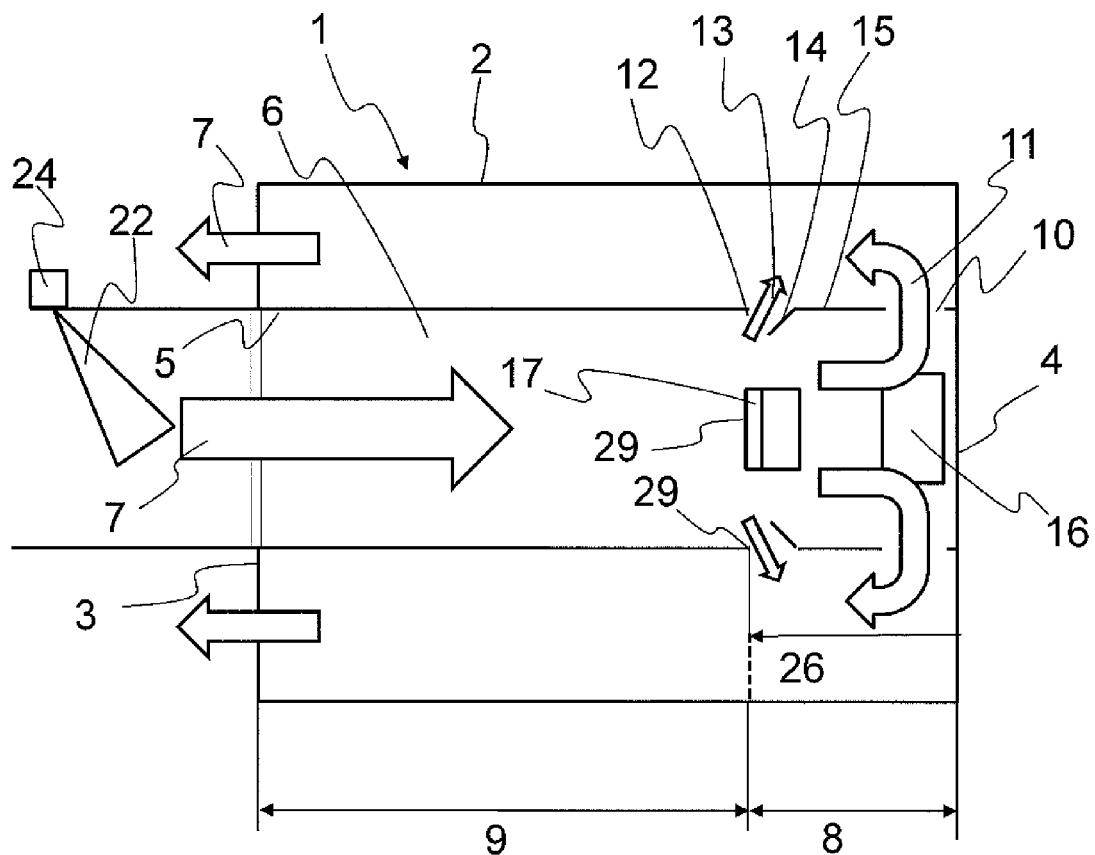
FIG. 3 is a longitudinal-sectional view of a second embodiment of an exhaust gas treatment unit.

FIG. 3 diagrammatically shows a second embodiment of the exhaust gas treatment unit 1. In this case, the tube 5 of the inflow region 6 extends through the first end 3 of the housing 2. A metering device 24 is provided on the tube 5 for adding a reagent 22 to the exhaust gas flow 7. The exhaust gas 7 leaves the inflow region 6 as a first partial exhaust gas flow 11 through a plurality of outlets 16 in the outlet region 10 or as a first partial exhaust gas flow 11 through openings 12. In this case, the openings 12 have baffle elements 14, which extend inward into the tube 5 and bring about a deflection of the second partial exhaust gas flow 13. The baffle elements 14 in this case are formed by walls 15 of the tube 5. The opening 12 has an opening cross-sectional area 17, which is indicated by hatching in the opening 12 in the rear wall of the tube 5. The exhaust gas 7, including the first partial exhaust gas flow 11 and the second partial exhaust gas flow 13, enters the deflecting region 8 through the openings 12 and through the outlets 16. The deflecting region 8 extends toward the return flow region 9 up to a depth 26 from the second end 4. The depth 26 extends to a boundary 29 of the opening 12 which is furthest away from the second end 4, with the opening 12 being disposed at the furthest point upstream in the inflow region 6. The return flow region 9 adjoins the deflecting region 8 and surrounds the inflow region 6.

Figure 4:
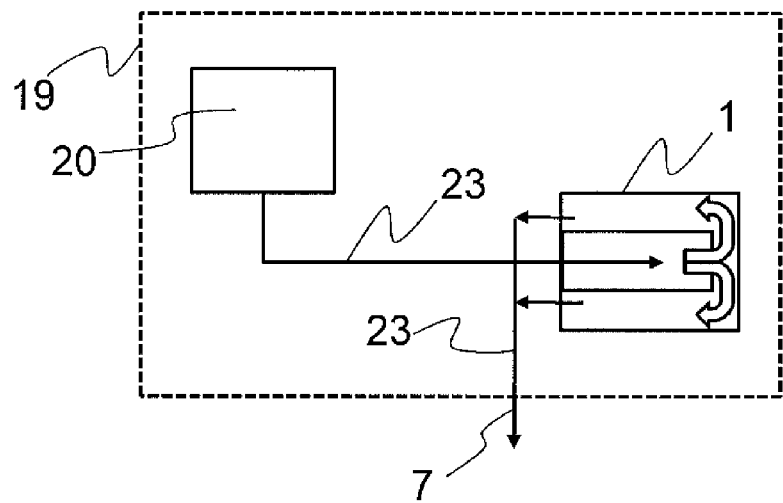
FIG. 4 is a block diagram of a vehicle.

FIG. 4 diagrammatically shows a vehicle 19 having an internal combustion engine 20. An exhaust line 23 carries the exhaust gas 7 from the internal combustion engine 20 through an exhaust gas treatment unit 1 to the environment.

The invention claimed is:

1. An exhaust gas treatment unit, comprising:
a housing having first and second mutually oppositely disposed ends;
a tube extending from said first end to said second end as an inflow region for an exhaust gas;
a deflecting region next to said second end for deflecting the exhaust gas; and
a return flow region extending between said tube and said housing;
said tube having an outlet region, adjacent said second end, from which a first partial exhaust gas flow flows into said deflecting region; and
said tube having at least one lateral opening in said deflecting region upstream of said outlet region, causing said first partial exhaust gas flow to collide in said deflecting region with at least one second partial exhaust gas flow flowing out of said at least one opening, said at least one opening defining a downstream boundary of said at least one opening in an exhaust gas flow direction;
said at least one opening having at least one baffle element configured to deflect said at least one second partial exhaust gas flow out of said tube and into said deflecting region;
said at least one baffle element being punched out and bent over at said downstream boundary from a wall of said tube into said inflow region and said at least one baffle element extending at an angle in an upstream direction for directing said at least one second partial exhaust gas flow into said deflecting region.

2. The exhaust gas treatment unit according to claim 1, wherein said at least one baffle element extends into said tube.

3. The exhaust gas treatment unit according to claim 1, wherein said at least one baffle element is formed by a wall of said tube.

4. The exhaust gas treatment unit according to claim 1, wherein said tube makes contact with said second end, and at least one lateral outlet forms said outlet region.

5. The exhaust gas treatment unit according to claim 4, wherein said at least one outlet directly adjoins said second end.

6. The exhaust gas treatment unit according to claim 1, wherein said tube has a cross-sectional area, and said at least one opening has an opening cross-sectional area being at least 150% of said cross-sectional area of said tube.

7. The exhaust gas treatment unit according to claim 1, wherein said at least one opening includes a plurality of openings each having a downstream boundary, and said at least one baffle element includes a plurality of baffle elements all being punched out and bent over, each at a respective one of said downstream boundaries of said openings from said wall of said tube into said inflow region.

8. A method for mixing an exhaust gas in an exhaust gas treatment unit, the method comprising the following steps:
   a) supplying the exhaust gas centrally through an inflow region;
   b) dividing the exhaust gas into at least one first partial exhaust gas flow and at least one second partial exhaust gas flow;
   c) deflecting the partial exhaust gas flows by:
      directing the at least one first partial exhaust gas flow to flow out of an outlet region of the inflow region and into a deflecting region and deflecting the at least one first partial exhaust gas flow again in the deflecting region, and
      directing the at least one second partial exhaust gas flow to flow into the deflecting region from at least one opening disposed upstream of the outlet region, the at least one opening defining a downstream boundary of the at least one opening in an exhaust gas flow direction, the at least one opening having at least one baffle element deflecting the at least one second partial exhaust gas flow out of the inflow region and into the deflecting region, the at least one baffle element being punched out and bent over at the downstream boundary from a wall of the tube into the inflow region and the at least one baffle element extending at an angle in an upstream direction for directing the at least one second partial exhaust gas flow into the deflecting region;
   d) colliding and mixing the at least one first partial exhaust gas flow with the at least one second partial exhaust gas flow in the deflecting region; and
   e) jointly passing on the at least one first partial exhaust gas flow and the at least one second partial exhaust gas flow through a return flow region.

9. The method according to claim 8, which further comprises forming the at least one second partial exhaust gas flow from at least 30% of the exhaust gas.

10. The method according to claim 8, which further comprises providing the at least one opening as a plurality of openings each having a downstream boundary, and providing the at least one baffle element as a plurality of baffle elements all being punched out and bent over, each at a respective one of the downstream boundaries of the openings from the wall of the tube into the inflow region.

11. A vehicle, comprising:
   an internal combustion engine;
   an exhaust line receiving exhaust gas from said internal combustion engine; and
   an exhaust gas treatment unit disposed in said exhaust line and including:
   a housing having first and second mutually oppositely disposed ends;
   a tube extending from said first end to said second end as an inflow region for an exhaust gas;
   a deflecting region next to said second end for deflecting the exhaust gas; and
   a return flow region extending between said tube and said housing;
   said tube having an outlet region, adjacent said second end, from which a first partial exhaust gas flow flows into said deflecting region; and
   said tube having at least one lateral opening in said deflecting region upstream of said outlet region, causing said first partial exhaust gas flow to collide in said deflecting region with at least one second partial exhaust gas flow flowing out of said at least one opening, said at least one opening defining a downstream boundary of said at least one opening in an exhaust gas flow direction;
   said at least one opening having at least one baffle element configured to deflect said at least one second partial exhaust gas flow out of said tube and into said deflecting region;
   said at least one baffle element being punched out and bent over at said downstream boundary from a wall of said tube into said inflow region and said at least one baffle element extending at an angle in an upstream direction for directing said at least one second partial exhaust gas flow into said deflecting region.

12. The vehicle according to claim 11, wherein said at least one opening includes a plurality of openings each having a downstream boundary, and said at least one baffle element includes a plurality of baffle elements all being punched out and bent over, each at a respective one of said downstream boundaries of said openings from said wall of said tube into said inflow region.

* * * * *